UNITED STATES PATENT OFFICE.

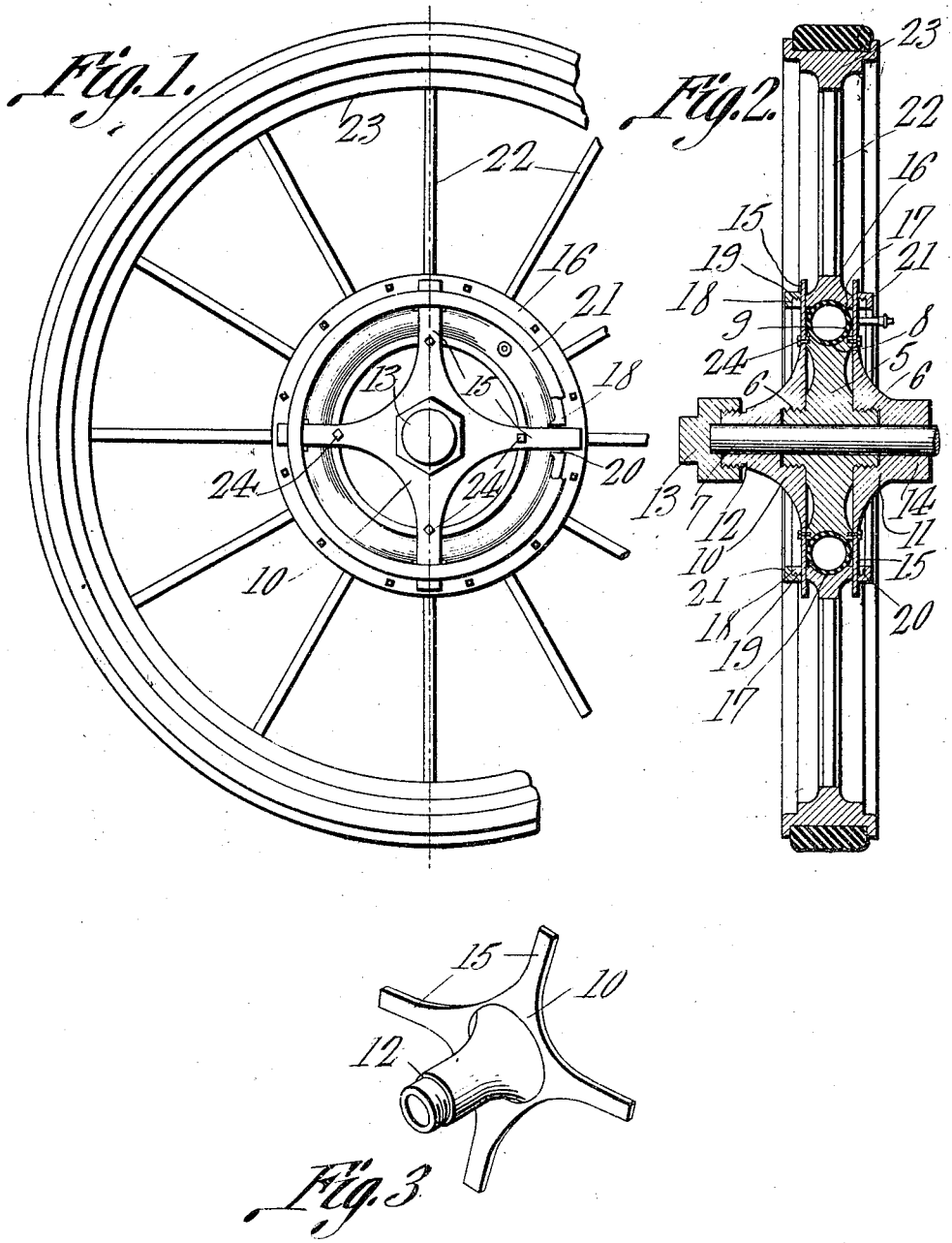

CHARLES ULMER, OF LISBON, NORTH DAKOTA.

VEHICLE-WHEEL.

1,001,907.

Specification of Letters Patent. Patented Aug. 29, 1911.

Application filed February 4, 1911. Serial No. 606,596.

*To all whom it may concern:*

Be it known that I, CHARLES ULMER, a citizen of the United States, residing at Lisbon, in the county of Ransom and State of North Dakota, have invented a new and useful Vehicle-Wheel, of which the following is a specification.

It is the object of the present invention to provide an improved vehicle wheel of that type embodying a pneumatic cushioning element which is arranged between normally concentric members constituting the hub of the wheel.

It is one aim of the present invention to provide, in a wheel of this type, novel means for holding the outer one of the two members mentioned, for rotation with the inner one thereof, the means being so constructed that it may be readily manipulated to separate the two sections.

In the accompanying drawings:—Figure 1 is a view in side elevation parts being broken away, of a wheel constructed in accordance with the present invention. Fig. 2 is a vertical sectional view therethrough. Fig. 3 is a perspective view of one of the hub plates.

In the drawings the hub of the wheel is illustrated as including, in its structure, a member 5 having lateral threaded extensions 6. The member is fitted upon an axle 7 or designed to be so fitted and in its periphery is formed with a circumscribing groove 8 which forms one of two seats for a pneumatic cushion 9. Hub plates 10 and 11 are threaded on to the extensions 6 of the member 5 in the manner illustrated in Fig. 2 of the drawings and the plate 10 is formed with a threaded sleeve extension 12 on to which is threaded a cap nut 13. The other hub plate, 11, is formed with a squared head 14 with which may be engaged a wrench for threading the said plate on to the respective extensions 6. Each of the hub plates 10 and 11 is formed with a number of radiating arms 15.

An annulus 16 is arranged to surround the hub 5 and is formed in its inner side with a groove 17 which opposes the groove 8 and forms the other seat for the cushion 9, it being understood that this cushion serves as a yieldable means for spacing the annulus from the hub. The annulus is formed with laterally projecting annular flanges 18 which are threaded as at 19 and are formed at intervals with slots 20. The arms 15 of the hub plates 10 and 11 project into the slots 20 and are confined therein, for limited play, by means of rings 21 which are threaded on to the flanges 18 in the manner illustrated in Fig. 2 of the drawings. Spokes 22 radiate from the annulus 16 and support a rim 23.

From the foregoing description of the invention it will be readily understood that whereas the parts of the wheel are normally held firmly in assembled relation and against accidental disarrangement, it being noted that the arms 15 are secured by means of bolts 24 to the sides of the hub 5, by removing these bolts, removing the rings 21, and then removing the hub plates, the parts of the wheel may be readily disassembled.

What is claimed is:—

In a vehicle wheel, a hub having a circumscribing groove, an annulus formed in its inner side with a groove, a pneumatic cushion arranged between the hub and annulus and fitting in the groove, the annulus having lateral threaded flanges, the flanges being formed with radial slots, the hub being formed with lateral threaded extensions, hub plates threaded upon the extensions and having radiating arms working in the slots in the annulus, the arms being secured removably to the hub radially beyond the extensions thereof, clamping rings threaded upon the flanges, one to each flange and confining the arms in the said slots, spokes radiating from the annulus, and a rim supported at the outer ends of the spokes.

In testimony that I claim the foregoing as my own, I have hereto affixed my signature in the presence of two witnesses.

CHARLES ULMER.

Witnesses:
JOHN C. BARBER,
J. T. MILNER.